United States Patent
Wang et al.

(10) Patent No.: US 8,786,951 B2
(45) Date of Patent: Jul. 22, 2014

(54) COMPOSITE OPTICAL FILM

(75) Inventors: Hsung-Hsing Wang, Kaohsiung (TW);
Po-Wen Lin, Kaohsiung (TW); Yi-Chia Wang, Kaohsiung (TW); Jui-Kai Hu, Kaohsiung (TW)

(73) Assignee: Eternal Chemical Co., Ltd., Kaohsiung (TW)

( * ) Notice: Subject to any disclaimer, the term of this patent is extended or adjusted under 35 U.S.C. 154(b) by 233 days.

(21) Appl. No.: 13/169,023

(22) Filed: Jun. 27, 2011

(65) Prior Publication Data
US 2012/0008212 A1 Jan. 12, 2012

(30) Foreign Application Priority Data

Jul. 9, 2010 (TW) ................................. 99122712 A

(51) Int. Cl.
G02B 5/02 (2006.01)

(52) U.S. Cl.
CPC ............ G02B 5/0242 (2013.01); G02B 5/0231 (2013.01)
USPC ......................................... 359/599; 359/601

(58) Field of Classification Search
USPC .......................................... 359/599, 601, 727
See application file for complete search history.

(56) References Cited

U.S. PATENT DOCUMENTS

| 3,909,649 | A | * | 9/1975 | Arsena ........................ 313/116 |
| 5,706,134 | A | * | 1/1998 | Konno et al. ................. 359/599 |
| 5,831,774 | A | * | 11/1998 | Toshima et al. ............... 359/707 |
| 6,511,701 | B1 | * | 1/2003 | Divigalpitiya et al. ......... 427/11 |
| 6,577,358 | B1 | * | 6/2003 | Arakawa et al. ............... 349/57 |
| 7,218,450 | B2 | * | 5/2007 | Ahn et al. ..................... 359/599 |
| 2007/0195431 | A1 | * | 8/2007 | Asakura et al. ............... 359/707 |
| 2009/0324890 | A1 | * | 12/2009 | Wu et al. ....................... 428/167 |
| 2010/0085735 | A1 | * | 4/2010 | Kim et al. .................... 362/97.2 |
| 2010/0086743 | A1 | * | 4/2010 | Wang et al. ................... 428/172 |
| 2011/0026124 | A1 | | 2/2011 | Kim et al. |

FOREIGN PATENT DOCUMENTS

| CN | 1834752 A | 9/2006 |
| CN | 101738675 A | 6/2010 |
| TW | M352033 | 3/2009 |

* cited by examiner

Primary Examiner — Thong Nguyen
(74) Attorney, Agent, or Firm — CKC & Partners Co., Ltd.

(57) ABSTRACT

A composite optical film is provided. The composite optical film sequentially includes a substrate, a light diffusion layer, and a light-gathering layer. The light diffusion layer includes a binder and plural micro beads dispersed therein. The thickness of the light diffusion layer is 2-6 times of the average diameter of the micro beads, and the distance between adjacent micro beads is smaller than the average diameter of the micro beads. The light-gathering layer has plural light-gathering micro structures.

13 Claims, 4 Drawing Sheets

COMPOSITE OPTICAL FILM

RELATED APPLICATIONS

This application claims priority to Taiwan Application Serial Number 099122712, filed Jul. 9, 2010, which is herein incorporated by reference.

BACKGROUND

1. Field of Invention

The present invention relates to a composite optical film applicable to a liquid crystal display.

2. Description of Related Art

Generally, a structure of a liquid crystal display (LCD) mainly includes a panel and a backlight module. The backlight module serving as a light source of the liquid crystal display includes a spot light source (e.g. a light-emitting diode) or a linear light source (e.g. a fluorescent lamp), a light guide plate and various optical films. Among the various elements of the backlight module, the spot light source or the linear light source consumes the most power and generates the biggest amount of heat. Therefore, it is an important subject how to reduce the power consumption and the heat-generating amount of the spot light source or the linear light source while maintaining or even enhancing brightness of the liquid crystal display.

At present, various optical films are used in the backlight module to efficiently make use of the light source, thereby enhancing the brightness of the LCD panel. This does not need to change the design of any element or consume additional power, so it has become the most economic and easy solution, for example, by use of a light-gathering film. The light-gathering film is always called the brightness enhancement film or prism film in this field. The light-gathering film mainly functions to gather the scattered light based on refraction and internal total reflection and then emit the light in the on-axis direction of about ±35°, so as to enhance the brightness of LCD. However, the light-gathering film typically has regularly-arranged light-gathering micro structures, which causes an interference or diffraction phenomenon of light refracted or reflected by different optical elements, so the liquid crystal display presents rainbow grain, light and shade stripes, moiré or Newton's ring.

To solve the above problems, a common method adopted in this field is to add a protective diffuser (or referred to as a top diffuser) to alleviate the above optical phenomenon. However, the disadvantages are that the top is diffuser costs too much and the thickness of the backlight module is increased after the optical film is added, and thus the backlight module becomes complicated, which does not conform to the trend of light and thin.

SUMMARY

Therefore, the present invention provides a composite optical film having light diffusion and light-gathering functions. This composite optical film does not only effectively increase the using efficiency of light but also has a thinner thickness, so that the assembly of the backlight module is easier and the above problems can be alleviated.

In order to achieve the above purpose, the present invention provides a composite optical film capable of effectively eliminating the rainbow grain. The composite optical film includes a substrate, a light diffusion layer disposed on the substrate and a light-gathering layer disposed on the light diffusion layer. The light diffusion layer includes a binder and plural micro beads dispersed therein. The thickness of the light diffusion layer is 2-6 times of an average diameter of the micro beads, and the distance between adjacent micro beads needs to be smaller than the average diameter of the micro beads. The light-gathering layer has plural light-gathering micro structures.

BRIEF DESCRIPTION OF THE DRAWINGS

The following objectives, features, advantages and embodiments of the present invention can be more fully understood, with reference made to the accompanying drawings as follows.

DETAILED DESCRIPTION

The phrases herein are only used for the purpose of describing the embodiments and are not intended to limit the scope of the present invention. For example, the phrase "a" in the specification covers both singular reference and plural reference unless the context clearly indicates otherwise.

The term "internal diffusion haze" used herein refers to a haze value (Hz) of an optical film measured according to JIS K7136 standard method after the structured surface of the optical film is filled with an resin having a refractive index (n) of 1.55 and cured.

Composite Optical Film Structure

Figure 1A:
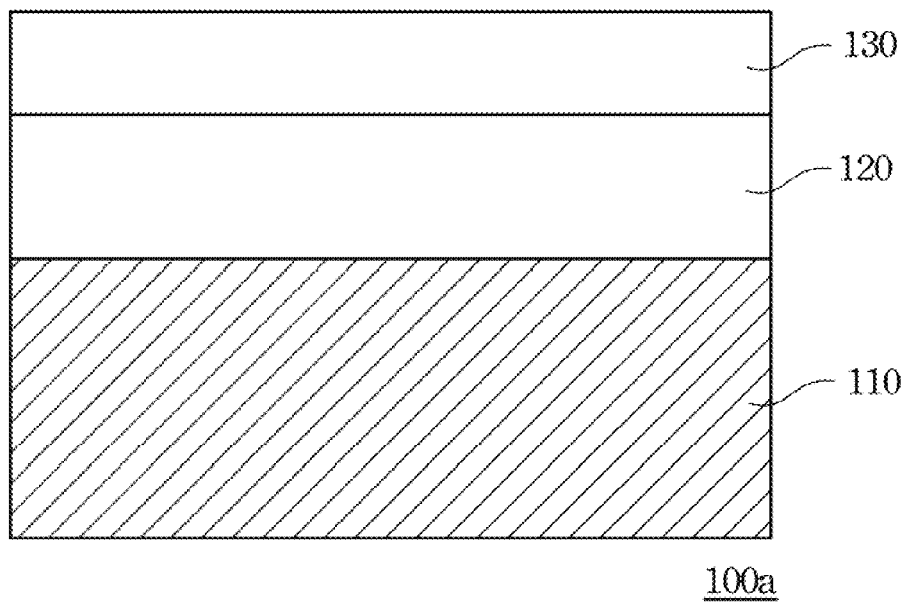
FIGS. 1A-1B are schematic cross-sectional structural views of different composite optical films according to different embodiments of the present invention.
Figure 1B:
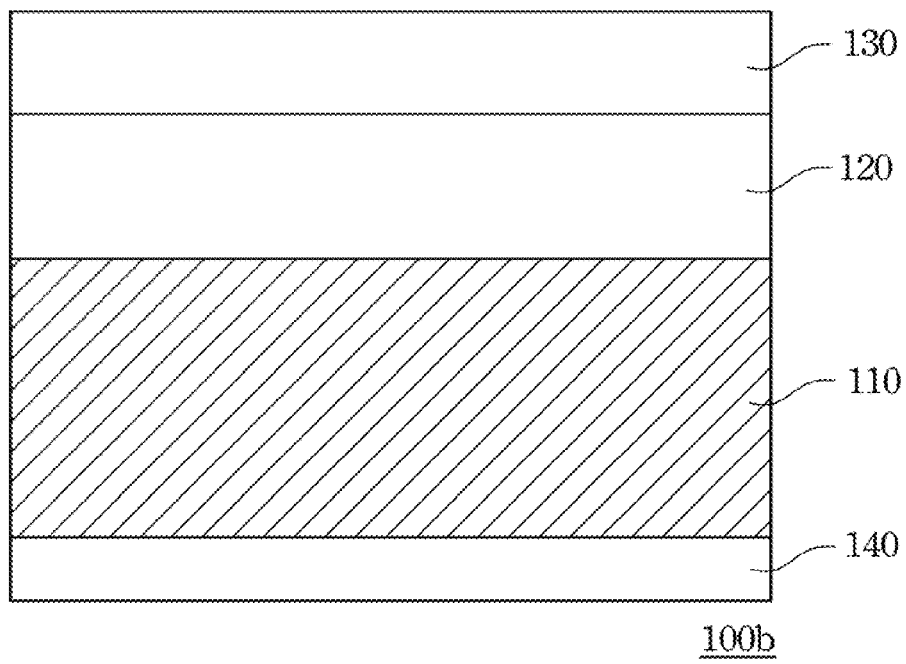

Referring to FIGS. 1A-1B, FIGS. 1A-1B are schematic cross-sectional structural views of different composite optical films according to different embodiments of the present invention. In FIG. 1A, a composite optical film 100a sequentially includes a substrate 110, a light diffusion layer 120 and a light-gathering layer 130 from bottom to top. To avoid scratching or abrading the composite optical film of the present invention accidentally during handling, the composite optical film of the present invention may optionally include a scratch-resistant layer 140 disposed on a bottom of the substrate 110, as shown in FIG. 1B. In FIG. 1B, the composite optical film 100b sequentially includes a scratch-resistant layer 140, a substrate 110, a light diffusion layer 120 and a light-gathering layer 130 from bottom to top.

The thickness and refractive index of the substrate 100 typically depend on the requirement of the optical products to be produced. The thickness of the substrate 100 is typically 15-300 μm. A material of the substrate 100 is preferably a high transparency material, such as glass or resin. The resin of the substrate 100 can be, for example, but not limited to: polyester resins, such as polyethylene terephthalate (PET) or polyethylene naphthalate (PEN); polyacrylate resins, such as polymethyl methacrylate (PMMA); polyolefin resins, such as polyethylene (PE) or polypropylene (PP); polycycloolefin resins; polyimide resins; polycarbonate resins; polyurethane resins; triacetyl cellulose (TAC); polylactic acid or a combination thereof. Polyester resins, polycarbonate resins or a combination thereof are preferable and polyethylene terephthalate is more preferable.

Figure 2:
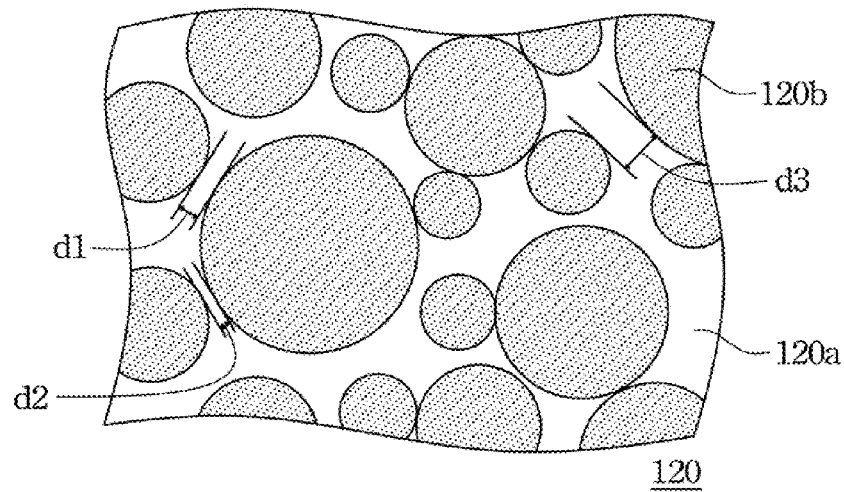
FIG. 2 is an enlarged schematic view of a light diffusion layer 120 in FIGS. 1A-1B.

Referring to FIG. 2, FIG. 2 is an enlarged schematic view of a light diffusion layer 120 of FIGS. 1A-1B. In FIG. 2, a surface of the light diffusion layer 120 has concave and convex structures, and includes a binder 120a and a plurality of micro beads 120b dispersed therein. The light diffusion layer 120 utilizes the different refractive index of the micro beads 120b and binder 120a to increase light refraction inside the light diffusion layer 120 so as to overcome the aforementioned rainbow grain problem.

A material of the binder 120a is preferably a colorless and transparent resin, for example, can be but not limited to acrylate resin, polyamide resin, epoxy resin, fluorocarbon resin, polyimide resin, polyurethane resin, alkyd resin, polyester resin or a mixture thereof. Acrylate resin, polyurethane resin, polyester resin or a mixture thereof are preferable. According to an embodiment, the refractive index of the binder 120a is from 1.40 to 1.60, and is preferably from 1.45 to 1.55.

According to the manner of inducing the crosslinking and/or polymerization reaction of the components in the binder, the binder can be divided into a thermal curing binder and a radiation curing binder. Therefore, the thermal curing binder refers to the binder in which the contained resin component may take the crosslinking reaction after being heated. The radiation curing binder refers to the binder in which the contained resin component may take polymerization or crosslinking reaction after receiving radiation energy of a certain wavelength. The radiation energy can be for example UV light or E-beam, and generally the intensity of the radiation energy of the UV light can be from 1 $mJ/cm^2$ to 500 $mJ/cm^2$, and is preferably from 50 $mJ/cm^2$ to 300 $mJ/cm^2$, for example.

The above binder 120a can be added with a curing agent, so that molecules of different resins are chemically bonded with each other to form crosslinking. The above curing agent can be, for example but not limited to, diisocyanate or polyisocyanate. In addition, the commercially available curing agents can be used, such as Desmodur 3390 (trade name) produced by Bayer Company.

A material of the micro beads 120b can be for example glass, metal oxide and plastic. The metal oxide can be, for example but not limited to, $TiO_2$, $SiO_2$, ZnO, $Al_2O_3$, $ZrO_2$ or a mixture thereof. The plastic can be, for example but not limited to, acrylate resin, styrene resin, urethane resin, silicone resin or a mixture thereof. According to an embodiment of the present invention, the material of micro beads is acrylate resin, silicone resin or a combination thereof.

A shape of the micro beads 120b is not particularly limited and can be for example a spherical shape, a rhombus, elliptical, rice-grain-shaped or biconvex-shaped, of which the spherical shape is preferable. The average diameter of the micro beads 120b is from about 1 µm to about 50 µm, and is preferably from about 3 µm to about 20 µm, and is more preferably from about 4 µm to about 15 µm.

According to an embodiment of the present invention, the refractive index of the micro beads 120b is from 1.3 to 2.5, and preferably from 1.4 to 1.6. Furthermore, to achieve better light diffusion effect and light transmittance effect, the difference between the refractive indexes of the micro beads 120b and binder 120a is from 0.01 to 0.4, and preferably from 0.02 to 0.2. If the difference between the refractive indexes of the micro beads 120b and the binder 120a is smaller than 0.01, the light reflection and light refraction inside the light diffusion layer 120 is insufficient, and as a result, the light diffusion effect is reduced. If the difference between the refractive indexes of the micro beads 120b and the binder 120a is larger than 0.4, the light reflection and light refraction inside the light diffusion layer 120 is excessive, and as a result, the light transmittance of the light diffusion layer 120 is reduced. Moreover, the refractive index of the micro beads 120b has to be smaller than the refractive index of the substrate 110, so as to avoid the light refracted by the micro beads 120b being deviated to the normal line (that is, a refraction angle is smaller) and reduce the light diffusion effect.

To achieve a good light diffusion effect, the thickness of the light diffusion layer 120 is larger than 2 times of an average diameter of the micro beads 120b, so that the micro beads 120b can be arranged uniformly and closely in the light diffusion layer 120. Furthermore, the arrangement of the micro beads in the light diffusion layer is not particularly limited and can be distributed uniformly in one layer or distributed uniformly in multi-layer. The micro beads are preferably distributed uniformly in multi-layer, and when the micro beads are distributed uniformly in multi-layer, the light refraction effect is better.

The above "close arrangement" means that the distance between adjacent micro beads 120b is smaller than the average diameter of the micro beads 120b.

The "distance between adjacent micro beads 120b" means the minimum distance between the surfaces of adjacent micro beads 120b on a cross-section of the light diffusion layer 120 as indicated by d1, d2, and d3 in FIG. 2.

According to an embodiment of the present invention, the thickness of the light diffusion layer 120 is 2-6 times of the average diameter of the micro beads 120b, and the distance between adjacent micro beads 120b is smaller than the average diameter of the micro beads 120b. If the distance between adjacent micro beads 120b is too large, the incident light may easily penetrate the light diffusion layer 120 and does not pass through any micro bead 120b, which will reduce the light diffusion effect of the light diffusion layer 120. If the thickness of the light diffusion layer 120 is larger than 6 times of the average diameter of the micro beads 120b, the light transmittance is low and the brightness performance is not good. Therefore, according to an embodiment, when the average diameter of the micro beads is about 5 µm, the average thickness of the light diffusion layer 120 is about larger than 10 µm, and is preferably from 10 µm to 30 µm.

According to another embodiment of the present invention, the distance between the micro beads 120b and the substrate 110 is smaller than the average diameter of the micro beads 120b, so as to obtain a preferable light diffusion effect.

The adding amount of the micro beads 120b may influence the arrangement of the micro beads 120b in the light diffusion layer 120, and the arrangement of the micro beads 120b is preferably multi-layered and uniform and close, so as to achieve a good light diffusion effect. According to an embodiment of the present invention, the solid content of the binder 120a is taken as a reference, and per 100 parts by weight of the binder 120a may be added with 80-210 parts by weight of the micro beads 120b. If adding amount of the micro beads 120b is too small, the density of the arrangement of the micro beads is insufficient, and thus the light diffusion effect is reduced. If the adding amount of the micro beads 120b is excessive, the content of the binder 120a in the light diffusion layer 120 is insufficient, thus influencing the adhesion force of the light diffusion layer 120 and the substrate 110. Furthermore, the coating amount of the light diffusion layer 120 may influence the light diffusion effect of the composite film at the same time. According to an embodiment of the present invention, the coating amount of the light diffusion layer 120 is from about 2.7 g/cm$^2$ to about 20 g/cm$^2$, and is preferably from 3 g/cm$^2$ to 13 g/cm$^2$. If the coating amount is smaller than 2.7 g/cm$^2$, the accumulation of the micro beads is insufficient, and thus the light diffusion effect is reduced. If the coating amount is larger than 20 g/cm$^2$, the brightness performance is not good on the contrary.

The light-gathering layer 130 of FIGS. 1A-1B has a plurality of light-gathering micro structures. The shape of the light-gathering micro structures can be, for example but not limited to, a regular or irregular columnar structure, a conical structure, a solid angular structure, an orange petaline block structure, a lens-shaped structure and a capsular structure or a combination thereof, of which the regular or irregular columnar structure is preferable. The above columnar structure may be linear, serpentine or zigzag, of which linear is preferable, and two adjacent columnar structures may be parallel or unparallel. Furthermore, the peak height of the columnar structure may vary randomly or regularly in the extending direction of the peak, and may also remain unchanged. When the peak height of the columnar structure varies in the extending direction of the peak, the variation amplitude is preferably larger than 3% of the average peak height, and is preferably from 5% to 50%.

The "columnar structure" is a single-peak columnar structure or a multi-peak columnar structure.

The "single-peak columnar structure" is a structure formed from a single columnar structure and having only a single peak.

The "multi-peak columnar structure" is a union structure formed from at least two columnar structures overlapping with each other and the height of the valley line between any two adjacent columnar structures is 30% to 95% of the height of the lower of the two adjacent columnar structures.

The "linear columnar structure" is a columnar structure where the ridge thereof is extended as a straight line.

The "serpentine columnar structure" is a columnar structure having a serpentine ridge. The serpentine columnar structure has at least one serpentine surface, and the curvature of the serpentine surface varies properly and the variation of the curvature is from 0.2% to 100%, and is preferably from 1% to 20% on the basis of the height of the serpentine columnar structure.

The "zigzag columnar structure" is a columnar structure having a zigzag ridge.

In general, if the refractive index of the light-gathering layer is high, the brightness of the LCD panel is high. The refractive index of the light-gathering layer 130 is at least 1.50, and is preferably from 1.52 to 1.65. To enhance the light diffusion effect of the composite optical film 100a and 100b, according to an embodiment of the present invention, the difference between the refractive indexes of the light-gathering layer 130 and the micro beads 120b is 0.02-0.4. If the difference between the refractive indexes of the micro beads 120b and the light-gathering layer 130 is smaller than 0.02, the light refraction is insufficient, thus reducing the light diffusion effect. If the difference between the refractive indexes of the micro beads 120b and the light-gathering layer 130 is larger than 0.4, the light reflection and light refraction are excessive, which reduces the light transmittance of the composite optical film on the contrary.

A material of the light-gathering layer 130 can be for example a cured resin coating. The resin coating may be for example a thermal curing resin, a radiation curing resin or a combination thereof, and is preferably a photo-curable resin. The resin coating may optionally include a photoinitiator, a crosslinking agent and other additives.

According to an embodiment of the present invention, the resin coating includes a UV curable resin, a photoinitiator and a crosslinking agent. The applicable UV curable resin can be, for example but not limited to, (meth)acrylate-based resins. The (meth)acrylate-based resins include, for example but not limited to, a (meth)acrylate resin, a urethane acrylate resin, a polyester acrylate resin, an epoxy acrylate resin or a mixture thereof, of which the methacrylate resin is preferable.

The monomers used to form the UV curable resin, can be, for example but not limited to epoxy diacrylate, halogenated epoxy diacrylate, methyl methacrylate, isobornyl acrylate, 2-phenoxy ethyl acrylate, acrylamide, styrene, halogenated styrene, acrylic acid, (meth)acrylonitrile, fluorene derivative diacrylate, biphenylepoxyethyl acrylate, halogenated biphenylepoxyethyl acrylate, alkoxylated epoxy diacrylate, halogenated alkoxylated epoxy diacrylate, aliphatic urethane diacrylate, aliphatic urethane hexaacrylate, aromatic urethane hexaacrylate, bisphenol-A epoxy diacrylate, novolac epoxy acrylate, polyester acrylate, polyester diacrylate, acrylate-capped urethane and a mixture thereof. Preferably, the monomers can be halogenated epoxy diacrylate, methyl methacrylate, 2-phenoxy ethyl acrylate, aliphatic urethane diacrylate, aliphatic urethane hexaacrylate, aromatic urethane hexaacrylate and a mixture thereof.

The photoinitiators can be, for example but not limited to benzophenone, benzoin, benzil, 2,2-dimethoxy-1,2-diphenylethan-1-one, 1-hydroxy cyclohexyl phenyl ketone, 2,4,6-trimethylbenzoyl diphenyl phosphine oxide (TPO) and a combination thereof, of which benzophenone is preferable.

The crosslinking agent may be for example a monomer or oligomer having one functional or multifunctional groups, of which the monomer or oligomer having multifunctional groups is preferable because it can effectively enhance the glass transition temperature of the resin coating. The crosslinking agent can be for example but not limited to (meth)acrylate; urethane acrylate such as aliphatic urethane acrylate, aliphatic urethane hexaacrylate or aromatic urethane hexaacrylate; polyester acrylate such as polyester diacrylate; epoxy acrylate such as bisphenol-A epoxy diacrylate; novolac epoxy acrylate; or a mixture thereof.

The above-mentioned (meth)acrylate may have two or more functional groups, of which the (meth)acrylate that has more functional groups is preferable. Examples of the (meth)acrylate suitable for the present invention include, but are not limited to tripropylene glycol di(meth)acrylate, 1,4-butanediol di(meth)acrylate, 1,6-hexanediol di(meth)acrylate, polyethyleneglycol is di(meth)acrylate, allylated cyclohexyl di(meth)acrylate, isocyanurate di(meth)acrylate, ethoxylated trimethylol propane tri(meth)acrylate, propoxylated glycerol tri(meth)acrylate, trimethylol propane tri(meth)acrylate, tris (acryloxyethyl) isocyanurate or a mixture thereof.

The commercially available (meth)acrylate crosslinking agents suitable for the present invention may be that with the trade name SR454®, SR494®, SR9020®, SR9021® or SR9041®, produced by Sartomer Company; that with the trade name 624-100®, produced by Eternal Company; and that with the trade name Ebecryl 600®, Ebecryl 830®, Ebecryl 3605® or Ebecryl 6700®, produced by UCB Company.

Furthermore, an inorganic powder may be added to the resin coating. The advantages of adding the inorganic powder include enhancing the hardness of the resin coating formed after being cured to avoid the change of optical properties of the light-gathering layer 130 due to the collapse of the light-gathering micro-structures on the surface of the light-gathering layer 130. The added inorganic powder can also enhance the brightness of the LCD panel. The inorganic powder is, for example but not limited to, ZnO, $SiO_2$, $SrTiO_3$, $ZrO_2$, $Al_2O_3$, $CaCO_3$, $TiO_2$, $CaSO_4$, $BaSO_4$ or a mixture thereof, of which $TiO_2$, $ZrO_2$, $SiO_2$, ZnO or a mixture thereof is preferable. According to an embodiment of the present invention, a particle size of the inorganic powder ranges from about 10 nm to about 350 nm, and preferably from 50 nm to 150 nm.

The light-gathering layer 130 may also directly adopt a commercially available light-gathering film. The commercially available light-gathering film may be for example the BEF90HP or BEF II 90/50 light-gathering film produced by Sumitomo 3M Company or the DIA ART H150100® or P210 light-gathering film produced by Mitsubishi Rayon Company.

The scratch-resistant layer 140 of FIG. 1B may prevent accidentally scratching or abrading the surface of the composite optical film 100b during handling, so as to maintain the optical effect of the optical film. Therefore, the scratch-resistant layer 140 has a pencil hardness of at least 3H as measured according to JIS K5400. A material of the scratch-resistant layer 140 can be, for example but not limited to, a thermal curing resin or photo-curable resin, and the thickness is from about 0.5 μm to about 30 μm, and is preferably from about 1 μm to 10 μm.

The composite optical film has a total transmittance of no smaller than 60% as measured according to JIS K7136 standard method. As described hereinbefore, the composite optical film has an internal diffusion haze of no smaller than 5%, and is preferably in the range from 5% to 80%, as measured according to JIS K7136 standard method. The micro structure layer and scratch-resistant layer of the composite optical film of the present invention have a surface resistivity smaller than $10^{13}\Omega/\square$ ($\Omega/\square$ represents ohm/square meter), and is preferably in the range from $10^8\Omega/\square$ to $10^{12}\Omega/\square$.

Fabricating Method of the Composite Optical Film

Hereinafter, the fabricating method of the composite optical films 100a and 100b of FIGS. 1A-1B is discussed. A light diffusion layer 120 is firstly formed on the substrate 110 in a manner of for example coating, spraying or laminating. In the coating manner, the coating containing the micro beads 120b and the binder 120a is coated on the substrate 110. The times of coating in the above coating manner are not particularly limited, which may be a single time or multiple times of coating. In the multiple times of coating, based on the small fluidity of the coating before dried, the micro beads 120b in the upper layer may fill the concaves formed between the micro beads 120b in the lower layer, so as to enhance the arrangement density of the micro beads 120b and also increase the thickness of the light diffusion layer 120.

Then, a light-gathering layer 130 is formed on the light diffusion layer 120 by directly laminating or coating. The coating manner is, for example but not limited to, slit die coating, micro gravure coating, or roller coating. If the light-gathering layer 130 is formed by the commercially available light-gathering film, one or more light-gathering films may be laminated directly on the light diffusion layer 120, thereby completing the combination of the light-gathering layer 130 and the diffusion layer 120. If the light-gathering layer 130 is formed by the resin coating, the resin coating is directly applied on the light diffusion layer 120 by a roll to roll continuous process, and after curing, the combination of the light-gathering layer 130 and the light diffusion layer 120 is completed.

To fabricate the composite optical film 100b of FIG. 1B, a scratch-resistant layer 140 is required to be formed on the bottom of the substrate 110. The scratch-resistant layer 140 is formed by applying a thermal curing resin or a photo-curable resin on another side of the substrate 110 opposite to the light diffusion layer and then heating or radiating to cure the coating, so as to accomplish the fabrication of the scratch-resistant layer 140.

Specific Examples

Figure 3:
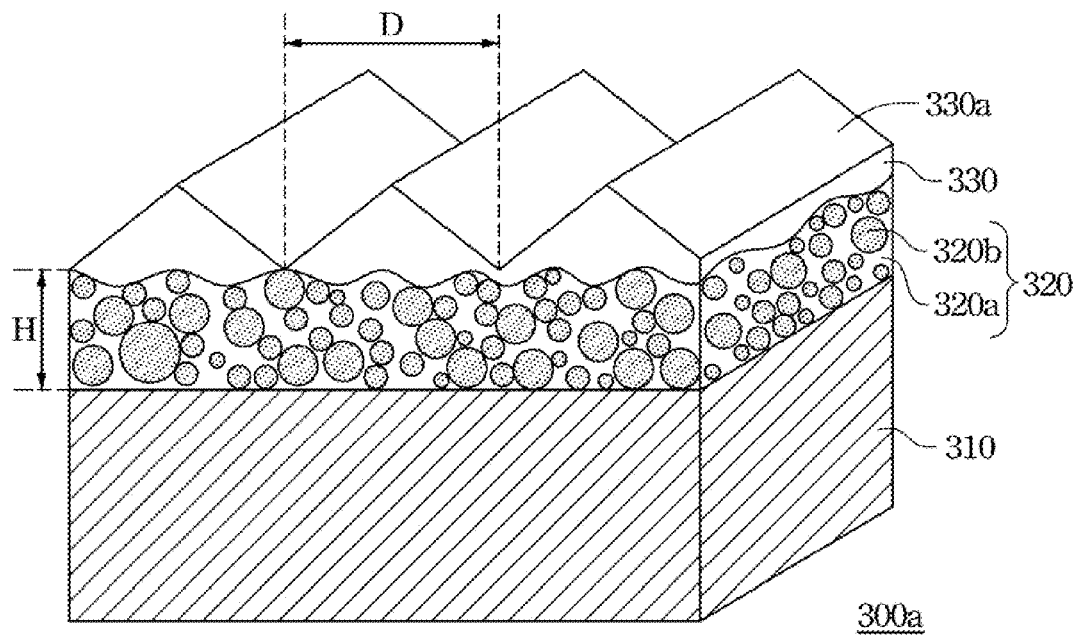
FIG. 3 is a schematic cross-sectional structural view of a specific embodiment of FIG. 1A.

Referring to FIG. 3, FIG. 3 is a schematic cross-sectional structural view of a specific embodiment of FIG. 1A.

In FIG. 3, a composite optical film 300a sequentially includes a substrate 310, a light diffusion layer 320 and a light-gathering layer 330 from bottom to top. The light diffusion layer 320 is formed by a coating having concave and convex micro structures, and the average thickness of the light diffusion layer 320 is H. The coating of the light diffusion layer 320 contains a binder 320a and micro beads 320b.

The light-gathering layer 330 on the light diffusion layer 330 has a plurality of prism columnar structures 330a serving as the light-gathering micro structures. The distance between adjacent prism columnar structures 330a is D, and an apical angle is 40°-120°. The prism columnar structure 330a may be formed by a slit die coating, a micro gravure coating or a roller coating method, for example. The resin of the light-gathering layer 330 is coated on the light diffusion layer 320, and a plurality of prism columnar structures having the light-gathering effect are formed by a roll to roll continuous process.

The "prism columnar structure" is formed by two slanted surfaces meeting on the top. The slanted surfaces can be curved surfaces or plane surfaces. Each of the two slanted surfaces meets with another slanted surface of an adjacent prism columnar structure on the bottom to form a valley. If the two slanted surfaces meet at the top where they are blunted to form a curved surface, the structure is also referred to as an "arc columnar structure".

The composite optical film may be used in the light source device, for example, advertising light boxes, flat panel displays or LED illumination apparatus. Especially, the composite optical film may be used in the direct type backlight module to serve as the optical film having light distribution and light-gathering composite functions, thereby effectively eliminating the rainbow grain phenomenon.

The composite optical film and preparation method of the present invention will be further explained in the following embodiments and comparative examples.

Preparation of Embodiments and Comparative Examples

The binder (with the trade name Eterac 5054-ts-40 produced by the Eternal Company, having a refractive index of 1.48), micro beads (with the trade name SR0365 produced by the Sekisui Company, having an average diameter of about 5 μm and a refractive index of 1.49), curing agent (with the trade name Desmodur 3390 produced by Bayer Company) and a solvent (ethyl acetate: butyl acetate=1:1 in volume) are mixed at a certain proportion to formulate a clear and transparent light diffusion layer coating with a solid content of 25 wt % and total weight of about 100 g. Then, the light diffusion layer coating is applied on a surface of a transparent PET film (U34®, produced by the Toray Company, with a refractive index of 1.62) having a thickness of 188 μm with a spreader. After the coating is dried, a light diffusion layer is formed on the substrate.

An acrylic resin coating is applied on the surface of the light diffusion is layer, and then a light-gathering layer having the prism structures is formed on the acrylic resin in a roller embossing manner. After that, the acrylic resin coating (with a refractive index of 1.57) is cured by a high-energy UV light to complete the fabricating of the composite optical film.

The structure of the composite optical film may be analyzed by capturing the cross section thereof under the SEM, wherein the thickness of the light-gathering layer is defined to be the distance from the prism peak to the prism bottom of the light-gathering layer. The thickness of the light diffusion layer may be obtained according to the following formula:

Distance from the prism peak to the substrate surface of the light-gathering layer−thickness of the light-gathering layer In regard with the composite optical film fabricated according to the above method, the weight ratio (B/B value) of the micro beads and the binder in the light diffusion layer and the coating amount (g/m$^2$) of the light diffusion layer are respectively changed in the embodiments 1-6 and the comparative examples 3-6, and the results are listed in the following Table 1.

TABLE 1

Embodiments and Comparative Examples

| | | Diffusion Layer | | | Thickness of |
|---|---|---|---|---|---|
| | | Weight Ratio of The Micro Beads/Binder | Coating Amount (g/m$^2$) | Thickness* (μm) | The Light-Gathering Layer (μm) |
| Embodiments | 1 | 0.90 | 4.8 | 14.9 | 27.1 |
| | 2 | 0.90 | 10.1 | 17.4 | 27.3 |
| | 3 | 1.20 | 2.9 | 12.9 | 26.2 |
| | 4 | 1.20 | 10.5 | 19.8 | 26.8 |
| | 5 | 2.00 | 3.4 | 14.1 | 26.5 |
| | 6 | 2.00 | 11.1 | 19.5 | 25.8 |
| Comparative examples | 3 | 0.30 | 1.1 | 9.55 | 26.5 |
| | 4 | 0.30 | 7.5 | 16.5 | 26.8 |
| | 5 | 0.90 | 2.5 | 10.9 | 26.2 |
| | 6 | 2.00 | 32.5 | 32.3 | 26.5 |

Comparative examples 1 and 2 not listed in Table 1 are commercially available diffusers (DI700, produced by the Eternal Company) and commercially available brightness enhancement films (PF972, produced by the Eternal Company), respectively. The structure of the commercially available diffuser in the comparative example 1 has a light diffusion layer formed by the binder having the micro beads on a side of the substrate, but is not provided with the light-gathering layer. In the structure of the commercially available brightness enhancement film in the comparative example 2, the light diffusion layer is also formed by the binder having the micro beads, but the light diffusion layer and the light-gathering layer are respectively disposed on two opposite sides of the substrate instead of the same side.

Test of the Embodiments and Comparative Examples

Thereafter, the test of the embodiments and comparative examples are carried out. The test includes the light and shade stripes, brightness and rainbow grain.

Firstly, the first test structure is assembled. In the first test structure, the optical film of the above embodiments and comparative examples is configured on a 10.1 inch backlight module with the trade name Eee PC (produced by the HP Company), and the original Eee PC backlight module contains a diffuser (model DI-700, produced by the Eternal Company).

The brightness test method includes conducting the brightness test on the first test structure with the BM-7® instrument provided by the TOPCON Company. The light and shade stripes test method includes conducting visual inspection on the optical film of the first test structure within 45° of the up, down, left and right directions of the on-axis to observe the light and shade stripes.

Then, the second test structure is assembled. The second test structure includes additionally overlapping a glass panel with bright surface on the first test structure. The rainbow grain test method includes conducting visual inspection on the rainbow grain test structure within 30° from the up and down of the on-axis or 45° from the left and right of the on-axis to observe the rainbow grain.

The above test results are listed in the following Table 2.

TABLE 2

Test Results

| | | d$^1$/D$^2$ | T$^3$/D | Brightness | Light and Shade Stripes | Rainbow Grain |
|---|---|---|---|---|---|---|
| Embodiments | 1 | <1 | 2.98 | 122.89% | slight | no |
| | 2 | <1 | 3.48 | 119.91% | no | no |
| | 3 | <1 | 2.57 | 123.72% | slight | no |
| | 4 | <1 | 3.96 | 117.86% | no | no |
| | 5 | <1 | 2.81 | 119.89% | no | no |
| | 6 | <1 | 3.90 | 107.65% | no | no |
| Comparative examples | 1 | — | — | 100.00% | no | no |
| | 2 | — | — | 119.64% | no | yes |
| | 3 | >1 | 1.91 | 127.72% | yes | yes |
| | 4 | >1 | 3.30 | 128.06% | yes | yes |
| | 5 | >1 | 2.17 | 126.13% | slight | yes |
| | 6 | <1 | 6.46 | 96.37% | no | no |

$^1$maximum distance between of the micro beads
$^2$Average Diameter of the micro beads
$^3$thickness of the light diffusion layer From the above test results, it is known that the comparative example 1 using the conventional diffuser does not have the light and shade stripes and rainbow grain, but the brightness performance is not good. The comparative example 2 using the conventional brightness enhancement film has a high brightness, but has the problem of rainbow grain.

Then, all the embodiments 1-6 and comparative examples 3-6 adopt the composite optical film formed by the light diffusion layer and the light-gathering layer, except that the thickness of the light diffusion layer/average diameter of the micro beads in the comparative example 6 is too large (6.46) which causes to that the brightness performance is not good, the rest has positive influence on the brightness.

Furthermore, in the comparative example 3, the accumulation of the micro beads in the light diffusion layer is insufficient (thickness of the light diffusion layer/average diameter of the micro beads is 1.91), the problems of the light and shade stripes and rainbow grain cannot be solved. Although the accumulation of the micro beads in the light diffusion layer (thickness of the light diffusion layer/average diameter of the micro beads) is sufficient in the comparative examples 4-5 and embodiments 1-6, the maximum distance between the micro beads of embodiments 1-6 is smaller than the average diameter of the micro beads, and the maximum distance between the micro beads in the comparative examples 4-5 are larger than the average diameter of the micro beads.

The above results show that the fact that whether the micro beads in the light diffusion layer are arranged closely enough (ratio of the maximum distance between the micro beads/ average diameter) and the accumulation of the micro beads in the light diffusion layer is sufficient (ratio of the thickness of the light diffusion layer/average diameter of the micro beads) influences the performance of the light and shade stripes and rainbow grain.

In Table 1, the weight ratios of the micro beads/binder of the comparative example 6, the embodiment 5 and the embodiment 6 are all 2.0, but the coating amount of the light diffusion layer in the comparative example 6 is too much (32.5 g/m$^2$), which causes that the brightness (Table 2) performance is not good.

The weight ratios of the micro beads/binder of the comparative example 5, the embodiment 1 and the embodiment 2 are all 0.9, but the coating amounts of the light diffusion layer are sequentially increased (2.5, 4.8, 10.1 g/m$^2$), and the ratios of the thickness of the light diffusion layer/average diameter of the micro beads are sequentially increased (2.17, 2.98, 3.48). Consequently, the embodiment 2 having the greatest coating amount does not have the light and shade stripes. The comparative example 5 having the least coating amount has the apparent light and shade stripes. Likewise, in the embodiments 3 and 4 in which the weight ratios of the micro beads/ binder are all 1.2, the light diffusion layer coating amounts are respectively 2.9 g/m$^2$ and 10.5 g/m$^2$, and the ratios of the thickness of the light diffusion layer/the average diameter of the micro beads are respectively 2.57 and 3.96, the same phenomenon also occurs. The results show that in addition to whether the content of the micro beads in the light diffusion layer coating is sufficient enough (the weight ratio of the micro beads/binder), the coating amount of the light diffusion layer must be sufficient (the ratio of the thickness of the light diffusion layer/average diameter of the micro beads), so as to completely solve the problems of the light and shade stripes and rainbow grain.

Figure 4:
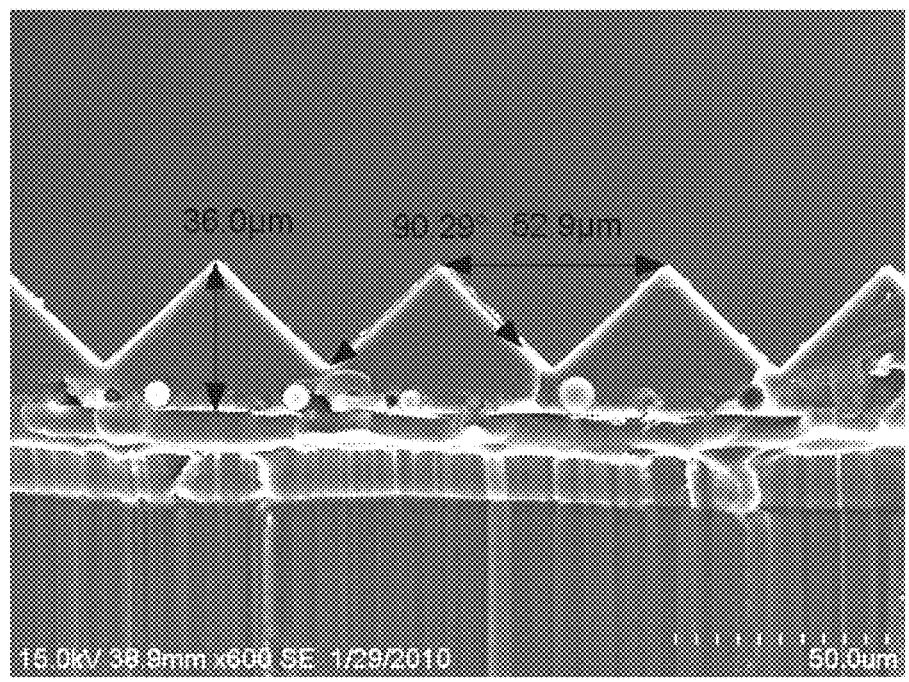
FIG. 4 is a scanning electron microscopic photograph showing a cross-sectional structure of comparative example 3.
Figure 5:
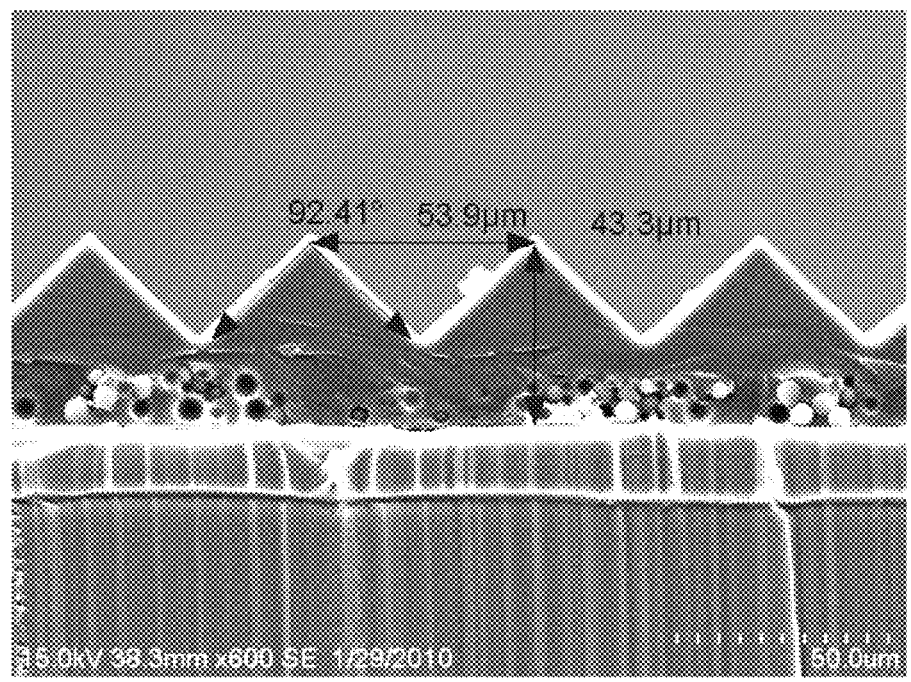
FIG. 5 is a scanning electron microscopic photograph showing a cross-sectional structure of a comparative example 4.
Figure 6:
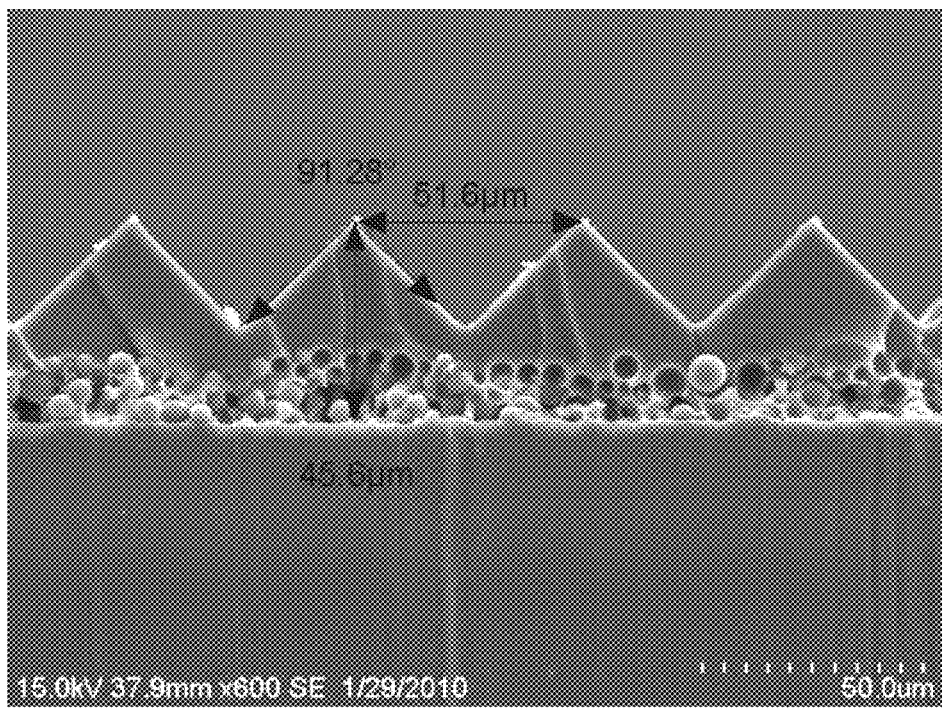
FIG. 6 is a scanning electron microscopic photograph showing a cross-sectional structure of embodiment 4.
Figure 7:
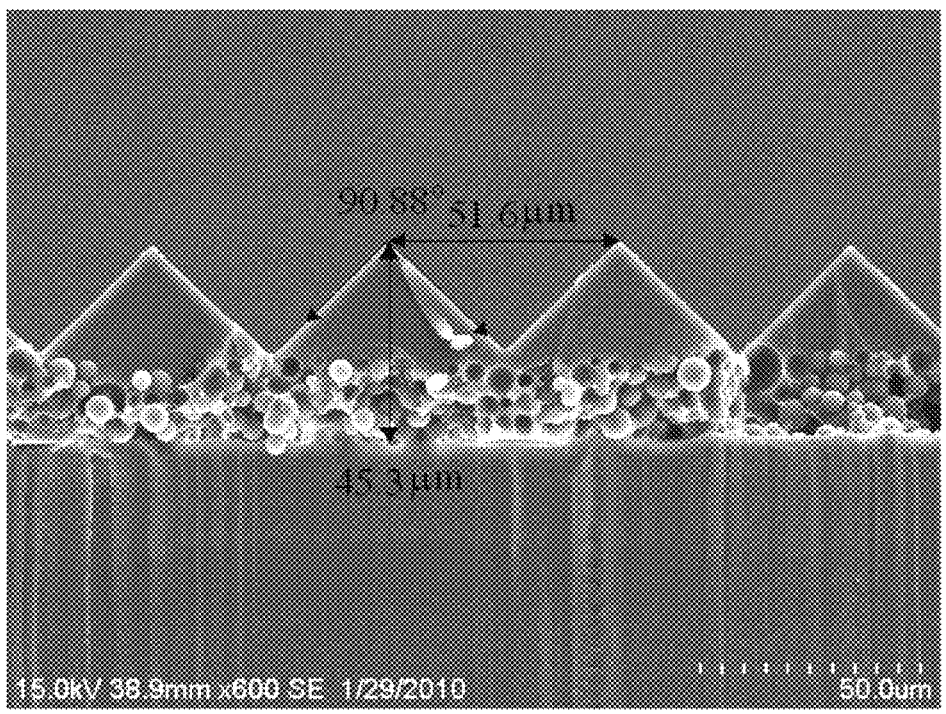
FIG. 7 is a scanning electron microscopic photograph showing a cross-sectional structure of embodiment 6.

From the SEM photographs of the comparative examples 3-4 in FIGS. 4-5, it can be seen that since the content of the micro beads in the light diffusion layer is too small, the micro beads cannot be arranged closely, and thus the comparative examples 3-4 has the severe light and shade stripes and rainbow grain problems. Although the comparative example 4 has a sufficient coating amount and a light diffusion layer with a sufficient thickness, the micro beads in the light diffusion layer are aggregated and cannot be distributed uniformly. From the SEM photographs of the embodiments 4 and 6 in FIGS. 6-7, it can be seen that the micro beads in the light diffusion layer are arranged closely and the thickness of the light diffusion layer is thick, so the embodiments 4 and 6 have good performance in the items of the rainbow grain and light and shade stripes.

Although the present invention has been described with reference to the above embodiments, these embodiments are not intended to limit the present invention. It will be apparent to those skilled in the art that various modifications and variations can be made without departing from the scope or spirit of the present invention. Therefore, the scope of the present invention shall be defined by the appended claims.

What is claimed is:

1. A composite optical film, comprising:
   a substrate;
   a light diffusion layer disposed on the substrate and comprising a plurality of micro beads and a binder, wherein a thickness of the light diffusion layer is 2-6 times of an average diameter of the micro beads, a distance between adjacent micro beads is smaller than the average diameter of the micro beads, and a coating amount of the light diffusion layer is about 2.7 g/cm$^2$-20 g/cm$^2$; and
   a light-gathering layer disposed on the light diffusion layer and comprising a plurality of light-gathering micro structures.

2. The composite optical film of claim 1, wherein the average diameter of the micro beads is 1-50 μm.

3. The composite optical film of claim 1, wherein the average diameter of the micro beads is 3-20 μm.

4. The composite optical film of claim 1, wherein a refractive index of the micro beads is smaller than a refractive index of the light-gathering layer and a difference between the refractive index of the micro beads and the refractive index of the light-gathering layer is 0.02-0.4.

5. The composite optical film of claim 1, wherein the micro beads relative to a solid content of the binder is about 80 to about 210 parts by weight of the micro beads per 100 parts by weight of the solid content of the binder.

6. The composite optical film of claim 1, wherein a material of the micro beads is plastic, metal oxide, or glass.

7. The composite optical film of claim 6, wherein the plastic is acrylic resin, styrene resin, urethane resin, silicone resin, or any combinations thereof.

8. The composite optical film of claim 1, wherein a material of the light-gathering layer comprises UV curable resin.

9. The composite optical film of claim 8, wherein the UV curable resin is (meth)acrylate resin, urethane acrylate resin, polyester acrylate resin, epoxy acrylate resin, or any combinations thereof.

10. The composite optical film of claim 1, wherein a shape of the light-gathering micro structures is a columnar structure, a conical structure, a solid angular structure, an orange petaline block structure, a lens-shaped structure, a capsular structure, or any combinations thereof.

11. The composite optical film of claim 10, wherein the columnar structure is a prism columnar structure, an arc columnar structure, or a mixture thereof.

12. The composite optical film of claim 10, wherein the columnar structure is a prism columnar structure having an apical angle of 40°-120°.

13. The composite optical film of claim 1, further comprising a scratch-resistant layer disposed on a bottom of the substrate.

\* \* \* \* \*